United States Patent
Suzuki et al.

(10) Patent No.: US 8,215,284 B2
(45) Date of Patent: Jul. 10, 2012

(54) MICRO-PILOT INJECTION IGNITION TYPE GAS ENGINE

(75) Inventors: Hajime Suzuki, Yokohama (JP); Hideki Nishio, Yokohama (JP); Yuuichi Shimizu, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 436 days.

(21) Appl. No.: 12/450,452

(22) PCT Filed: Nov. 20, 2008

(86) PCT No.: PCT/JP2008/071592
§ 371 (c)(1),
(2), (4) Date: Oct. 29, 2009

(87) PCT Pub. No.: WO2009/078260
PCT Pub. Date: Jun. 25, 2009

(65) Prior Publication Data
US 2010/0043744 A1    Feb. 25, 2010

(30) Foreign Application Priority Data

Dec. 14, 2007    (JP) .................................. 2007-323878

(51) Int. Cl.
*F02B 19/00* (2006.01)
*F02M 7/00* (2006.01)
*F02M 69/04* (2006.01)
*F01L 1/34* (2006.01)

(52) U.S. Cl. ...................... 123/260; 123/90.15; 123/435; 123/445

(58) Field of Classification Search .................. 123/260, 123/435, 436, 445, 478–480, 485, 490, 525, 123/527, 575, 90.15–90.17, 179.3, 179.16, 123/179.18; 701/113, 114; 73/114.03, 114.16, 73/114.18
See application file for complete search history.

(56) References Cited

U.S. PATENT DOCUMENTS 4,976,241 A * 12/1990 Ishida et al. ............. 123/406.37
(Continued)

FOREIGN PATENT DOCUMENTS

JP    S62-255545    11/1987
(Continued)

OTHER PUBLICATIONS

International Council on Combustion Engines; Paper No. 163, Status and Potentials of the Gas Engines; Ingemar Nylund, Waertsilae Finland Oy, Finland, ingemar.nylund@wartsila.com; CIMAC Congress 2004, Kyoto, Japan.

*Primary Examiner* — John T. Kwon
*Assistant Examiner* — Johnny Hoang
(74) *Attorney, Agent, or Firm* — Manabu Kanesaka; Kenneth M. Berner; Benjamin J. Hauptman (57) ABSTRACT

What is disclosed is a micro-pilot injection ignition type gas engine, whereby an air fuel ratio control in starting the engine is executed with enhanced precision, by means of introducing skip-firing intermittent operations which reflect the engine operation conditions, while an idling time span can be shortened or omitted.

The engine includes: a gas valve that opens and closes a fuel-gas passage in front of each cylinder, so as to arbitrarily control the throat area as well as the opening-closing time span of the gas valve; an engine speed detecting unit to detect the engine speed; a combustion diagnosis unit to detect an engine combustion state through a cylinder pressure distribution along elapsed time, as to each cylinder; an opening-closing control unit as to the gas valve, so as to control the intermittent opening-closing of the gas valve according to the levels of the detected engine speed as well as the cylinder pressure distribution; whereby, in starting the engine, the intermittent opening-closing of the gas-valve enables at least one skip-firing mode that brings an enhanced fuel-supply pressure-pulsation with which a relatively large amount of fuel-gas is supplied per engine cycle with firing so that the air fuel-gas ratio of each cylinder reaches a prescribed target value.

3 Claims, 5 Drawing Sheets

U.S. PATENT DOCUMENTS

| | | | |
|---|---|---|---|
| 5,604,303 A * | 2/1997 | Tomisawa et al. | 73/114.06 |
| 6,644,274 B2 * | 11/2003 | Hasegawa et al. | 123/406.41 |
| 6,810,320 B2 * | 10/2004 | Yamamoto et al. | 701/111 |
| 2003/0188714 A1 * | 10/2003 | Yamamoto et al. | 123/435 |
| 2005/0159877 A1 * | 7/2005 | Hattori | 701/107 |
| 2005/0205022 A1 * | 9/2005 | Ito et al. | 123/27 GE |
| 2008/0162335 A1 * | 7/2008 | Ito et al. | 705/37 |
| 2009/0037084 A1 * | 2/2009 | Suzuki et al. | 701/112 |

FOREIGN PATENT DOCUMENTS

| | | |
|---|---|---|
| JP | H09-014057 | 1/1997 |
| JP | 2001-132505 | 5/2001 |
| JP | 2003-065093 | 3/2003 |
| JP | 2005-273556 | 10/2005 |
| JP | 2006-132478 | 5/2006 |
| JP | 2007-247569 | 9/2007 |

* cited by examiner

Fig. 1

Number 1 in a square : A firing cycle
Number 0 in a square : A non-firing cycle

L : Left bank cylinder, R : Right bank cylinder

Fig. 3 - 1

1/2 Skip-firing allocation table

| Cylinder No. | L1 | R1 | L5 | R5 | L3 | R3 | L6 | R6 | L2 | R2 | L4 | R4 |
|---|---|---|---|---|---|---|---|---|---|---|---|---|
| Cycle 1  | 1 | 0 | 1 | 0 | 1 | 0 | 1 | 0 | 1 | 0 | 1 | 0 |
| 2  | 0 | 1 | 0 | 1 | 0 | 1 | 0 | 1 | 0 | 1 | 0 | 1 |
| 3  | 1 | 0 | 1 | 0 | 1 | 0 | 1 | 0 | 1 | 0 | 1 | 0 |
| 4  | 0 | 1 | 0 | 1 | 0 | 1 | 0 | 1 | 0 | 1 | 0 | 1 |
| 5  | 1 | 0 | 1 | 0 | 1 | 0 | 1 | 0 | 1 | 0 | 1 | 0 |
| 6  | 0 | 1 | 0 | 1 | 0 | 1 | 0 | 1 | 0 | 1 | 0 | 1 |
| 7  | 1 | 0 | 1 | 0 | 1 | 0 | 1 | 0 | 1 | 0 | 1 | 0 |
| 8  | 0 | 1 | 0 | 1 | 0 | 1 | 0 | 1 | 0 | 1 | 0 | 1 |
| 9  | 1 | 0 | 1 | 0 | 1 | 0 | 1 | 0 | 1 | 0 | 1 | 0 |
| 10 | 0 | 1 | 0 | 1 | 0 | 1 | 0 | 1 | 0 | 1 | 0 | 1 |
| 11 | 1 | 0 | 1 | 0 | 1 | 0 | 1 | 0 | 1 | 0 | 1 | 0 |
| 12 | 0 | 1 | 0 | 1 | 0 | 1 | 0 | 1 | 0 | 1 | 0 | 1 |
| 13 | 1 | 0 | 1 | 0 | 1 | 0 | 1 | 0 | 1 | 0 | 1 | 0 |
| 14 | 0 | 1 | 0 | 1 | 0 | 1 | 0 | 1 | 0 | 1 | 0 | 1 |
| 15 | 1 | 0 | 1 | 0 | 1 | 0 | 1 | 0 | 1 | 0 | 1 | 0 |
| 16 | 0 | 1 | 0 | 1 | 0 | 1 | 0 | 1 | 0 | 1 | 0 | 1 |
| 17 | 1 | 0 | 1 | 0 | 1 | 0 | 1 | 0 | 1 | 0 | 1 | 0 |
| 18 | 0 | 1 | 0 | 1 | 0 | 1 | 0 | 1 | 0 | 1 | 0 | 1 |
| 19 | 1 | 0 | 1 | 0 | 1 | 0 | 1 | 0 | 1 | 0 | 1 | 0 |
| 20 | 0 | 1 | 0 | 1 | 0 | 1 | 0 | 1 | 0 | 1 | 0 | 1 |

Fig. 3 - 2

1/5 Skip-firing allocation table

| Cylinder No. | L1 | R1 | L5 | R5 | L3 | R3 | L6 | R6 | L2 | R2 | L4 | R4 |
|---|---|---|---|---|---|---|---|---|---|---|---|---|
| Cycle 1  | 1 | 0 | 1 | 1 | 1 | 0 | 1 | 1 | 1 | 1 | 1 | 0 |
| 2  | 1 | 1 | 0 | 1 | 1 | 1 | 0 | 1 | 1 | 1 | 1 | 1 |
| 3  | 1 | 1 | 1 | 0 | 1 | 1 | 1 | 0 | 1 | 1 | 1 | 1 |
| 4  | 1 | 1 | 1 | 1 | 0 | 1 | 1 | 1 | 0 | 1 | 1 | 1 |
| 5  | 0 | 1 | 1 | 1 | 1 | 0 | 1 | 1 | 1 | 0 | 1 | 1 |
| 6  | 1 | 0 | 1 | 1 | 1 | 1 | 0 | 1 | 1 | 1 | 1 | 0 |
| 7  | 1 | 1 | 0 | 1 | 1 | 1 | 1 | 0 | 1 | 1 | 1 | 1 |
| 8  | 1 | 1 | 1 | 0 | 1 | 1 | 1 | 1 | 0 | 1 | 1 | 1 |
| 9  | 1 | 1 | 1 | 1 | 0 | 1 | 1 | 1 | 1 | 0 | 1 | 1 |
| 10 | 0 | 1 | 1 | 1 | 1 | 0 | 1 | 1 | 1 | 1 | 0 | 1 |
| 11 | 1 | 0 | 1 | 1 | 1 | 1 | 0 | 1 | 1 | 1 | 1 | 0 |
| 12 | 1 | 1 | 0 | 1 | 1 | 1 | 1 | 0 | 1 | 1 | 1 | 1 |
| 13 | 1 | 1 | 1 | 0 | 1 | 1 | 1 | 1 | 0 | 1 | 1 | 1 |
| 14 | 1 | 1 | 1 | 1 | 0 | 1 | 1 | 1 | 1 | 0 | 1 | 1 |
| 15 | 0 | 1 | 1 | 1 | 1 | 0 | 1 | 1 | 1 | 1 | 0 | 1 |
| 16 | 1 | 0 | 1 | 1 | 1 | 1 | 0 | 1 | 1 | 1 | 1 | 0 |
| 17 | 1 | 1 | 0 | 1 | 1 | 1 | 1 | 0 | 1 | 1 | 1 | 1 |
| 18 | 1 | 1 | 1 | 0 | 1 | 1 | 1 | 1 | 0 | 1 | 1 | 1 |
| 19 | 1 | 1 | 1 | 1 | 0 | 1 | 1 | 1 | 1 | 0 | 1 | 1 |
| 20 | 0 | 1 | 1 | 1 | 1 | 0 | 1 | 1 | 1 | 1 | 0 | 1 |

Fig. 4

Fig. 5

MICRO-PILOT INJECTION IGNITION TYPE GAS ENGINE

BACKGROUND OF THE INVENTION

1. Technical Field

The present application relates to a micro-pilot injection ignition type gas engine and an air fuel ratio control method thereof. The gas engine of the mentioned type inhales premixed air fuel mixture into each cylinder, namely, into a main chamber, and initiates combustion of the mixture inside the main chamber with at least one pilot flame that jets out from a pre-chamber through at least one nozzle hole made in a pre-chamber housing, as an ignition-source for the mixture inside the main chamber; whereby the pilot flame jet is induced by means of combustion of an amount of micro-pilot fuel-oil that is injected through a pilot fuel injector as well as by means of combustion of a part of the air fuel mixture inhaled inside the pre-chamber from the main chamber through at least one nozzle hole. In the gas engines of the mentioned type, this application relates to an air fuel ratio control device that performs an open-close control as to a gas valve for each cylinder.

2. Description of the Related Art

In conventional micro-pilot injection ignition type gas engines, pre-mixed air fuel-gas mixture of lean gas concentration is supplied into each main combustion chamber; the mixture is ignited by an ignition device such as a micro-pilot ignition mechanism with a fuel-oil injector; as a result, at least one ignition flame jet for igniting the air fuel mixture in the main chamber is induced. Thus, the starting mechanism of the micro-pilot injection ignition type gas engines is complicated. Therefore, in starting the gas engine of the type, smooth combustion transition from a starting stage to a load operation stage is not so easy to be secured in comparison with other gas engines of different types. Thus far, much effort has been made to improve the starting performance as to the micro-pilot injection ignition type gas engine.

Figure 5:
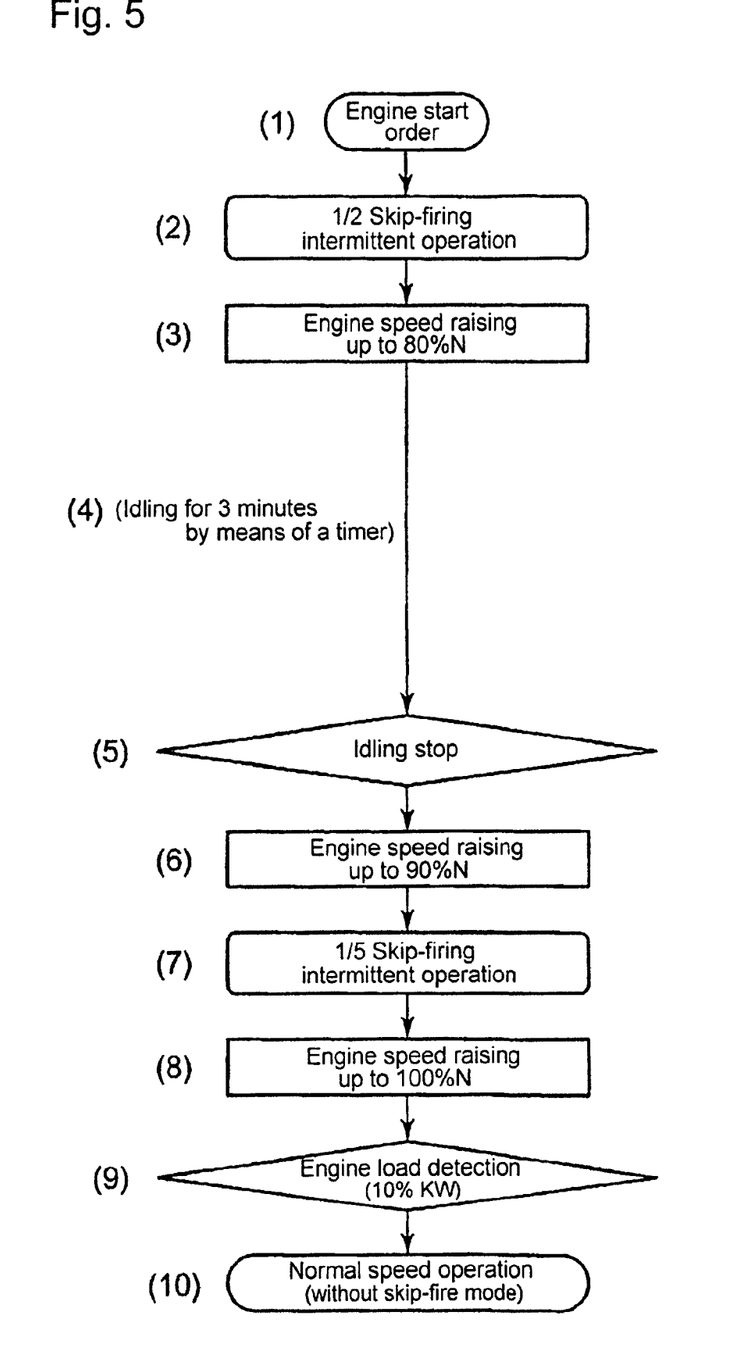
FIG. 5 shows an example of a flow-chart diagram as to a starting method of a gas engine with a micro-pilot ignition system, according to a conventional technology.

FIG. 5 shows an example of a flow-chart diagram as to a starting method of a gas engine with a micro-pilot ignition system, according to a conventional technology.

Figure 31:
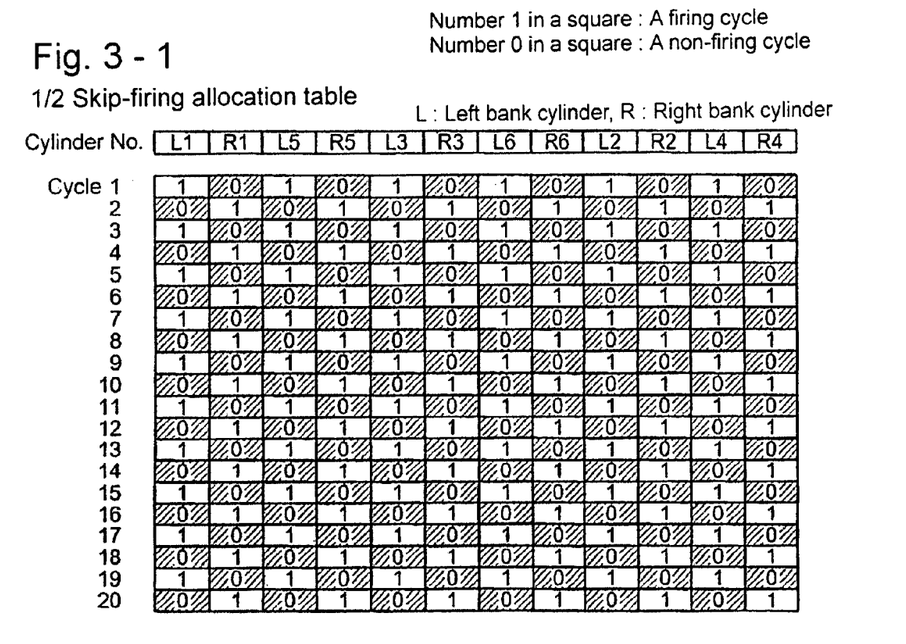

As a first step (Step 1) in FIG. 5, a start order is transmitted to the engine; then, the engine is started with a ½ skip-firing intermittent operation (Step 2). As shown in FIG. 3-1, during the ½ skip-firing intermittent operation, each cylinder alternates a cycle with firing and a cycle without firing; that is, each cylinder repeats a cycle with combustion and a cycle without combustion alternately; in addition, Numerals 0 and 1 in the table of FIG. 3-1 correspond to the cycle without firing and the cycle with firing, respectively.

Figure 32:
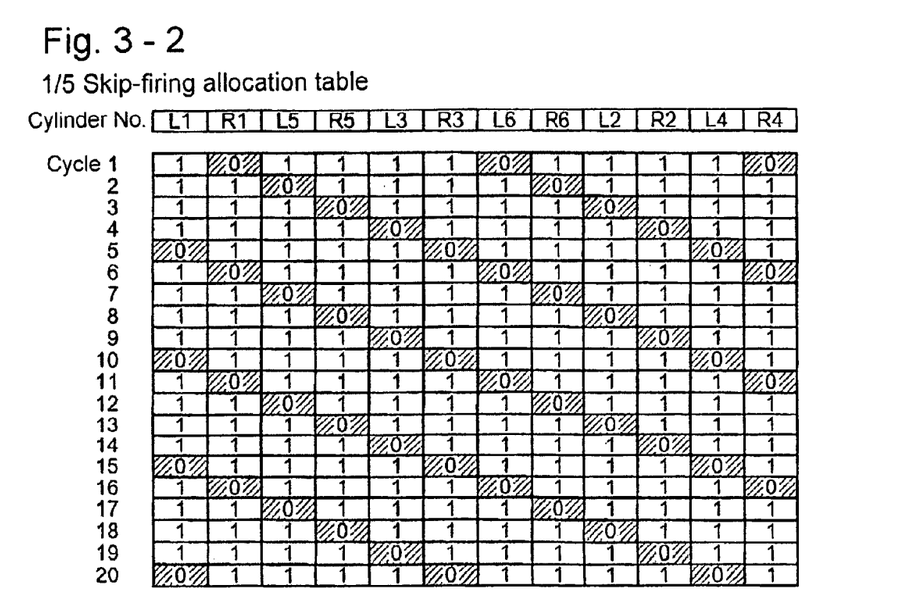

In the case of a ⅕ skip-firing intermittent operation, each cylinder repeats a cluster of every five consecutive cycles with a non-firing cycle and four consecutive firing cycles as shown in the table of FIG. 3-2; thereby, Numerals 0 and 1 also correspond to the cycle without firing and the cycle with firing, respectively.

Besides the ½ skip-fring intermittent operation or ⅕ skip-firing intermittent operation, there can be another type of intermittent operation mode, such as a n/m skip-firing intermittent operation during which n non-firing cycles (skipped cycles) exist within m consecutive cycles. Various kinds of intermittent operations are collectively cited with a term "skip mode" or "skip-firing mode" in this specification. Specifically, the terms ½ skip-firing intermittent operation and ⅕ skip-firing intermittent operation in the above description are generalized, for example, with terms "a first skip mode" and "a second skip mode" respectively. Further, when n is equal to 1, then a 1/m skip-firing intermittent operation or a 1/m skip-firing mode can be defined; whereby, a non-firing cycle is placed between m−1 consecutive firing cycles and m−1 consecutive firing cycles; thereby, a ratio of valve-open-frequency to valve-closed-frequency increases, as the number m increases. Hereafter, this ratio is called a valve opening-ratio. In addition, m consecutive engine cycles are often called a cluster of cycles in this specification.

Secondly, the speed of the engine is increased (Step 3) to an 80% speed (80% N), that is, a prescribed idling speed of a rated speed N, while the ½ skip-firing intermittent operation is performed; at this stage, a timer is activated so that the engine continues the 80% N idling for three minutes (Step 4 and Step 5); then, the engine speed is increased to a 90% speed (90% N) of the speed N (Step 6); further, the ½ skip-firing intermittent operation is shifted to the ⅕ skip-firing intermittent operation (Step 7), namely, fuel supply frequency is increased as a state of one firing-skip cycle during two consecutive cycles is shifted to a state of one firing-skip during five consecutive cycles; then (Step 8), the engine speed is increased to 100% of the rated speed N (100% N).

Thirdly, when 10% load of the rated engine-load is detected (Step 9) during the speed of 100% N, the engine is put under normal speed operation without a skip-firing mode.

A patent reference JP1997-14057 discloses a fuel supply device for starting a gas engine, the engine comprising:

a first fuel passage toward each main combustion chamber (each cylinder);

a second fuel passage directly toward a pre-chamber, the second passage being provided with a slow-open valve that begins to open the moment the engine is started, while the opening of the valve is increased in proportion to elapsed time;

whereby an air fuel ratio inside the pre-chamber is held in a flammable range, for a predetermined time span so that the engine starting performance is improved.

However, the mentioned conventional technologies involve the following subject to be solved.

Specifically, in the four-stroke cycle gas engines, fuel-gas and air are premixed and supplied to each main combustion chamber; further, in micro-pilot injection ignition type gas engines, at least one flame jet produced by the mentioned micro-pilot ignition system ignites the premixed air fuel mixture in the main chamber, and a lean-burn is performed; therefore, in the conventional gas engines of the type, engine speed fluctuations with unstable behavior are prone to occur, while the engine is in its starting process.

A prerequisite to secure an ignition performance and a starting performance as to the four-stroke cycle gas engines is to bring the air fuel ratio of the air fuel mixture in the main chamber close to a stoichiometric mixture ratio as to the fuel-gas being used; however, when the engine is started and the speed is low, the fuel-gas supply rate is low, while the air supply rate is large because of relatively ample piston pumping work; thus, the air fuel ratio during starting the engine is too lean and is in fact considerably below the stoichiometric ratio.

To increase such a lean air fuel ratio, in conventional spark ignition gas engines with a sparkplug in each cylinder, a throttle (an air fuel ratio controller) is usually provided in the air passage so as to lessen air supply; however, it is difficult to introduce such a manner into the micro-pilot injection ignition type gas engines, because such a throttle (an obstacle) in the air passage of engines of the type is not conducive to producing relatively higher output and enhanced performance in normal operation.

Thus, a conventional gas engine of a micro-pilot injection ignition type controls air fuel ratios in starting by means of enhancing fuel-gas flow rates, i.e. fuel-gas supply pressure pulsation through, while the ½ skip-firing intermittent operation and the ⅕ skip-firing intermittent operation are incorporated according to FIG. 5.

However, in the method itself according to FIG. 5, a series of the starting steps are routinely executed without feedback of engine operation conditions; namely, after a start order is transmitted to the engine, the engine is started with the ½ skip-firing intermittent operation; the speed of the engine is increased to 80% of the rated speed N (80% N); at this stage, a timer is activated so that the engine continues at 80% N for three minutes; then, the engine speed is raised to 90% of the speed N (90% N); at which speed the ½ skip-firing intermittent operation is changed to the ⅕ skip-firing intermittent operation; then, the engine speed is raised up to 100% of the rated speed N (100% N).

Thus, until the engine speed is raised up to the rated speed N, the ½ skip-firing intermittent operation and the ⅕ skip-firing intermittent operation are incorporated according to FIG. 5, while 3 minutes idling operation is placed on a part way in the starting steps. However, there is no feedback of engine operation conditions on the series of the starting steps; that is, there is no reflection of the engine conditions on the parameters (e.g., to determine n/m or 1/m based on real-time engine conditions) of the skip-firing intermittent operations. Further, the conventional manner according to FIG. 5 is not sufficiently useful to reduce the idling time span although the time reduction is desired.

SUMMARY OF THE INVENTION

In view of the above-stated conventional technology, the present invention is aiming at providing a micro-pilot injection ignition type gas engine, whereby an air fuel ratio control in starting the engine is executed with enhanced precision, by means of introducing skip-firing intermittent operations the operations which reflect the engine operation conditions, while an idling time span in the starting steps can be shortened or omitted.

In order to reach the goals as mentioned, the present specification discloses a micro-pilot injection ignition type gas engine
that ignites and burns premixed air fuel-gas mixture induced in each main combustion chamber,
by means of at least one pilot flame jetting out from a pre-chamber to the main chamber through at least one pre-chamber nozzle hole communicating the main chamber to the pre-chamber in which a fuel-oil injector injects micro-pilot fuel oil to produce a pre-chamber combustion gas as a source of the flame jet,
the gas engine comprising:
a gas valve that delivers and cuts fuel-gas at a position in front of each cylinder, so as to arbitrarily control a throat area as well as an opening/closing time span of the gas valve;
an engine speed detecting unit to detect the engine speed;
a cylinder pressure sensor provided at each cylinder so as to continually measure pressure levels as to each cylinder;
a combustion diagnosis unit to monitor the pressure levels so that the diagnosis unit analyzes an engine combustion state through a cylinder pressure distribution along elapsed time, the distribution as to each cylinder being formed in the diagnosis unit;
an opening-closing control unit as to the gas valve, so as to control an intermittent opening/closing of the gas valve in response to the engine speed and the pressure distribution;
whereby, in starting the engine, the intermittent opening/closing of the gas-valve brings into operation at least one skip-firing mode that brings an enhanced fuel-supply pressure-pulsation with which an increased amount of fuel-gas is supplied per one engine cycle with firing so that the air fuel-gas ratio of each cylinder reaches a prescribed target value.

It is noted that this paragraph is described in relation to claim 1.

In a preferable aspect according to the above embodiment, the opening-closing control unit as to the gas valve makes the gas valve for each cylinder open and close, intermittently per each cylinder in turn according to a firing sequence of the engine, so that air fuel-gas ratio reaches the prescribed target value, with the skip-firing mode, and with a series of time spans as to the variable valve-opening-time span of the gas valve, the time spans being changed step by step.

In other words, the opening-closing control unit preferably makes the gas valve for each cylinder open and close according to the skip-firing mode so that the air fuel-gas ratio reaches a prescribed value; further, the opening-time span of the gas valve is changed step by step during the engine starting.

This paragraph is described in relation to claim 2.

In another preferable aspect according to the above (the first) embodiment, the opening-closing control unit makes the gas valve for each cylinder open and close with: a first skip-firing mode of a lower valve-opening-ratio in the case when the cylinder pressure distribution along elapsed time, as analyzed by the combustion diagnosis unit, corresponds to a prescribed target distribution, whereas the opening-closing control unit makes the gas valve open and close with a second skip-firing mode of a higher valve-opening-ratio in the case when the cylinder pressure distribution along elapsed time does not reach the prescribed target distribution.

This paragraph is described in relation to claim 3.

According to this invention (claim 1), the engine includes:
an engine speed detecting unit to detect the engine speed;
a cylinder pressure sensor provided at each cylinder so as to continually measure pressure levels as to each cylinder;
a combustion diagnosis unit to retrieve the pressure levels so that the diagnosis unit analyzes an engine combustion state through a cylinder pressure distribution along elapsed time, the distribution as to each cylinder being formed in the diagnosis unit;
an opening-closing control unit as to the gas valve, so as to control an intermittent opening/closing of the gas valve in response to the engine speed and the pressure distribution;
whereby, in starting the engine, the intermittent opening/closing of the gas-valve enables at least one skip-firing mode that brings an enhanced fuel-supply pressure-pulsation with which an increased amount of fuel-gas is supplied per one engine cycle with firing so that the air fuel-gas ratio of each cylinder reaches a prescribed target value.

Therefore, in starting the engine, each cylinder performs and repeats engine cycles (a cluster of cycles) of a skip-firing mode by means of a corresponding skip-firing intermittent operation of the gas valve; hence, a relatively strong fuel-gas pressure pulsation is caused in a fuel-gas pipe that supplies fuel-gas to the gas valve, the pulsation bringing relatively large fuel-gas supply while the valve is being opened in comparison with usual cycle repetition without skipping; thus, the air fuel-gas ratio is enhanced in firing engine-cycles. Accordingly, a cluster of intermittent combustion cycles is repeated in each main combustion chamber; yet, the combustion during a firing cycle in each main chamber becomes stable and regular.

In addition, in the skip-firing mode, for example, in the ½ skip-firing intermittent operation, the gas-valve opening and the gas-valve closing are repeated on a one-by-one basis, in turn; namely, in the main chamber, an engine cycle with firing and an engine cycle without firing are repeated in turn.

In the next place, the opening-closing control unit as to the gas valve estimates an engine (cylinder) combustion state as to each cylinder, based on a cylinder pressure distribution along elapsed time as analyzed by the combustion diagnosis unit that continually monitors cylinder pressure signals detected by the cylinder pressure sensor fitted to each cylinder.

Furthermore, in a skip-firing mode, for example, the already-mentioned number m (hereby the denominator 2 of the ½) of corresponding consecutive cycles as to an intermittent cycle-cluster is 2; whereby, a gas-valve opening and a gas-valve closing are repeated on a one-by-one basis, in turn. Where the mentioned 1/m skip-firing mode is concerned, the less the number m is the stronger the fuel-gas supply pressure pulsation is. Based on this principle, a skip-firing mode, namely, a skip-firing intermittent operation can be selected in consideration of the parameter m.

In addition, in claim 2, the opening-closing control unit preferably makes the gas valve for each cylinder open and close intermittently, in turn, cylinder by cylinder, according to an engine firing sequence, so that the air fuel-gas ratio reaches the prescribed target value, with at-least-one skip-firing mode, and with a series of time spans as to the variable valve-opening-time span of the gas valve, the time spans being changed step by step.

Thus, the engine is provided with a cylinder pressure sensor for each cylinder that continuously measures the pressure in each cylinder; the combustion diagnosis unit continually monitors the cylinder pressure signals from the sensor, analyzes the cylinder pressure signals, and forms a pressure distribution along elapsed time; further, the opening-closing control unit as to the gas valve estimates what degree to which the formed pressure distribution along elapsed time conforms with a prescribed distribution, and selects a skip-firing mode with which the gas valve is operated so as to ensure that the air fuel-gas ratio is in the correct range for smooth and stable engine-starting. Preferably, in addition, the valve-opening-time span is adjusted during starting the engine, so as to reflect the combustion states. In this way, with the selected skip-firing intermittent operation, the air fuel-gas ratio control in starting the engine becomes elaborate.

Further, the conventional idling time can be dispensed with; as a result, the engine starting time span can be reduced.

In a preferable aspect that corresponds to claim 3, the opening-closing control unit makes the gas valve for each cylinder open and close with a first skip-firing mode of a lower valve-opening-ratio in the case when the cylinder pressure distribution along elapsed time as analyzed by the combustion diagnosis unit corresponds to a prescribed target distribution, whereas the opening-closing control unit makes the gas valve open and close with a second skip-firing mode of a higher valve-opening-ratio in the case when the cylinder pressure distribution along elapsed time does not reach the prescribed target distribution.

Thus, in a skip-firing mode, for example, in the ½ skip-firing intermittent operation, the already-mentioned number m (hereby the denominator 2 of the ½) of corresponding consecutive cycles as to an intermittent cycle-cluster is 2; whereby, a gas-valve opening and a gas-valve closing are repeated on a one-by-one basis, in turn.

In the case when the cylinder pressure distribution as to a cylinder has a weak part (a decompressed part therein), a first skip-firing mode, for example ½ skip-firing intermittent operation, is continued so that the distribution agrees with a prescribed distribution, until the combustion in the cylinder becomes stable; in the case when the detected cylinder pressure distribution has already reached the prescribed distribution, the gas valve as well as the engine is operated with a second skip-firing mode, for example ⅕ skip-firing intermittent operation, the second skip-firing mode being a higher valve-opening-ratio than the first mode.

BRIEF DESCRIPTION OF THE DRAWINGS

In what follows is described a non-limiting example of a preferred embodiment which is visualized in the accompanying drawings, in which:

FIGS. 3-1 and 3-2 show a starting action allocation table (i.e., a starting skip-firing allocation table) as to each cylinder of the gas engine with a micro-pilot ignition system;

It is noted that the mentioned conventional technology is depicted not in the first place but in FIG. 5, as the conventional technology can be simply explained in contrast to the presented embodiment.

The items with the numerals in the figures are explained as follows:
1 a gas valve:
100 an engine (a gas engine);
101 a main combustion chamber;
102 a piston;
102a a cylinder-liner;
103 an air-fuel intake port;
104 an air-fuel intake valve;
106 a cylinder head;
109 a fuel-gas pipe;
110 a gas-air mixer;
10 a pre-chamber housing;
11 a pre-chamber nozzle hole;
12 a pre-chamber;
2 a control unit to open and close the gas valve 1;
3 a combustion diagnosis unit;
4 an engine speed detecting unit;
5 a cylinder pressure sensor;
13 a fuel-oil injector;
14 a fuel-oil injector holder; and
15 a fuel-oil inlet piece.

DETAILED DESCRIPTION OF THE INVENTION

Best Mode for Carrying Out the Invention

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
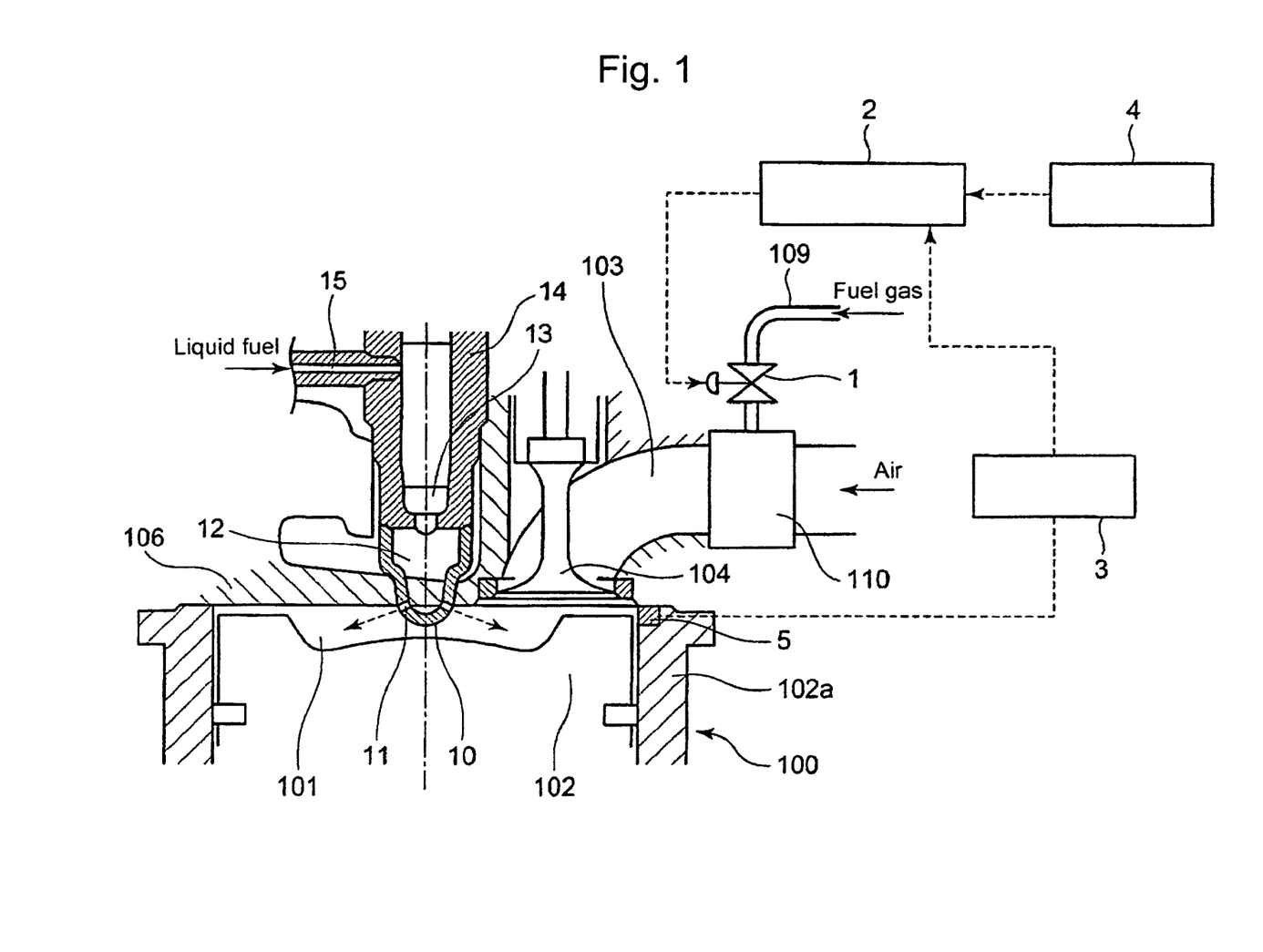
FIG. 1 shows a whole structure of a four-stroke cycle gas engine according to an embodiment of the present invention.

FIG. 1 shows a whole structure of a four-stroke cycle gas engine according to an embodiment of the present invention; whereby, the component depicted with Numeral 100 is a four-stroke cycle gas engine of a micro-pilot ignition type; Numeral 102a shows a cylinder-liner for each cylinder; Numeral 102 shows a reciprocating piston for each cylinder, and Numeral 106 shows a cylinder head for each cylinder; the bottom surface of the cylinder head 106, the upper surface of the piston 102, and the inner surface of the cylinder-liner 102a substantially form a main combustion chamber 101 to which at least one air intake port 103 and at least one exhaust gas port (not shown) are connected; at least one air intake valve 104 is provided and the valve opens and closes the air intake port 103.

At the upstream side of the air intake port 103, a gas-air mixer 110 is provided the mixer which pre-mixes fuel-gas supplied through a fuel-gas pipe 109 with charging air; thereby, a fuel-gas air mixture pre-mixed at the mixer reaches the air intake valve 104 through the air intake port 103; then, the mixture flows into the main combustion chamber 101; in addition, a flow rate of fuel-gas that is supplied to the mixer through the fuel-gas pipe 109 is regulated by means of controlling opening levels of at least one throttle (not shown) in a gas valve 1.

As described above, Numeral 1 shows a gas valve that opens and closes the mentioned throttle therein; further, the valve 1 is configured to control the levels of the throttle openings, and opening time spans of the throttle; that is, not only the throat of the fuel-gas passage connected to the fuel-gas pipe 109 but also the opening time span of the throat can be varied during operation.

Numeral 10 shows a pre-chamber housing inside which a pre-chamber 12 is formed; Numeral 14 shows a fuel-oil injector holder inside which a fuel-oil injector 13 is provided; Numeral 15 shows a fuel-oil inlet piece connected to the injector 13; through the fuel-oil inlet piece, fuel oil for micro-pilot ignition is supplied to the fuel-oil injector 13.

On the other hand, after the fuel-gas air mixture pre-mixed at the mixer is inducted through the air intake valve into each cylinder i.e., into the main combustion chamber 101, during a suction stroke of the piston, the fuel-gas air mixture is compressed by a compression stroke of the piston; then, the fuel-gas air mixture flows into the pre-chamber 12 through the (at-least-one) pre-chamber nozzle hole 11, before the fuel-oil injector 13 injects a small amount of fuel-oil toward the fuel-gas air mixture in the pre-chamber and the fuel-oil itself ignites by the aid of high temperature of the fuel-gas air mixture, the high temperature being brought about by the compression stroke. Further, the ignited fuel-oil not only makes hot combustion gas but also burns the fuel-gas air mixture inside the pre-chamber so as to also make a hot combustion gas. Thus, the hot combustion gas produced in the pre-chamber explosively jets out through the pre-chamber nozzle hole 11, into the main combustion chamber 101, the hot combustion gas making a flame jet that commences the combustion of the fuel-gas air mixture in the main chamber 101.

The configuration stated above is the same as that of a conventional gas engine of a micro-pilot ignition type. The present invention relates to an improvement in starting performance as to the gas engine of the type.

As already described, with the gas valve 1, not only the throat of the fuel-gas passage connected to the fuel-gas pipe 109 but also the opening time span of the throat can be varied during operation; and, the opening/closing operation of the gas valve is controlled by an opening-closing control unit 2.

In combination with the opening-closing control unit 2, the engine 100 comprises:
an engine speed detecting unit 4 configured to detect engine speeds and transmit signals of the detected speeds to the opening-closing control unit 2;
a combustion diagnosis unit 3 that retrieves signals as to time-to-time changing cylinder-pressures of each cylinder, from a cylinder pressure sensor 5 that is arranged at each cylinder, while the unit 3 diagnoses the retrieved signals as to the pressures so as to estimate time-to-time changing cylinder-combustion states (i.e., cylinder pressure distributions along elapsed time) of each cylinder, and transmits the diagnosed combustion-state data to the opening-closing control unit 2.

Because the combustion diagnosis unit 3 needs a time parameter or engine revolution parameter in analyzing the mentioned pressure distribution, it is noted, as a matter of course, that the combustion diagnosis unit 3 also retrieves engine speed signals from an engine speed sensor, whether the sensor is the engine speed detecting unit 4 or another separate sensor.

With reference to FIGS. 2, 3-1, 3-2, and 4, an embodiment according to the present invention will now be explained.

Figure 2:
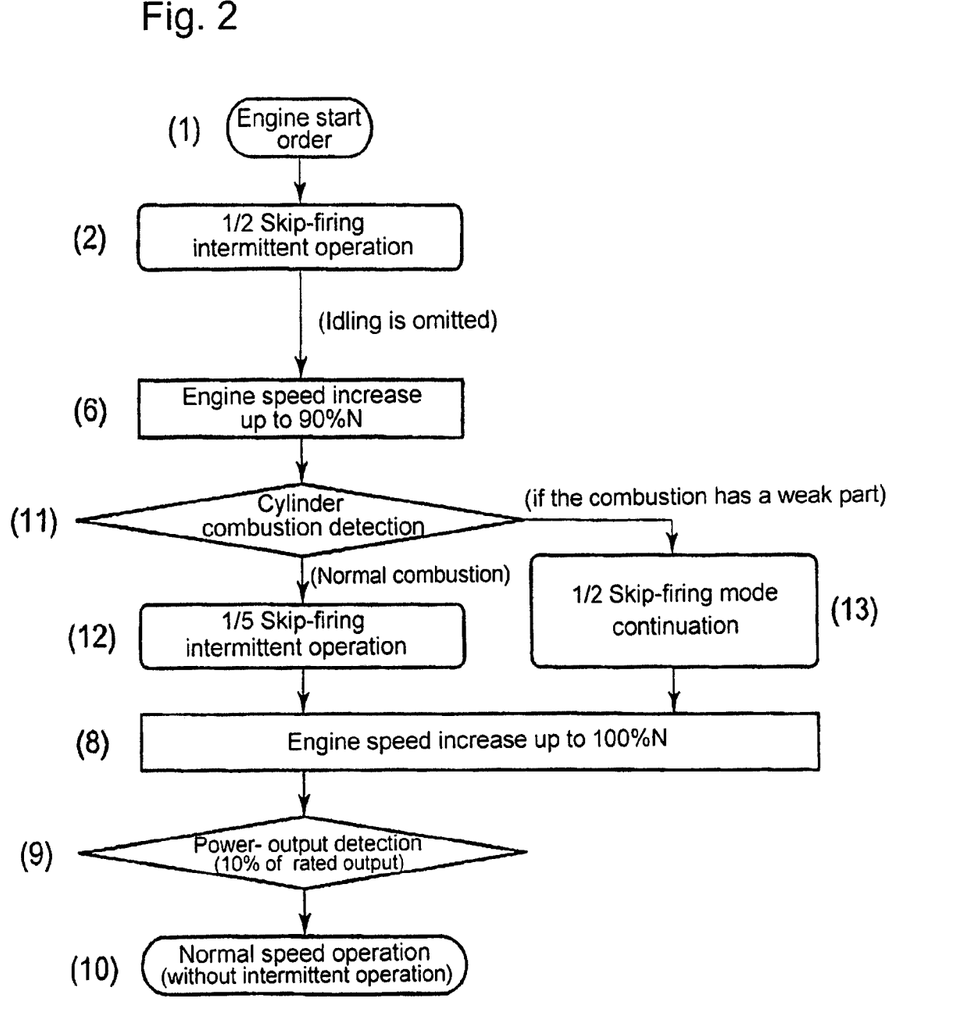
FIG. 2 shows an example of a flow-chart diagram as to a starting method of a gas engine with a micro-pilot ignition system, according to an embodiment of the present invention.
Figure 4:
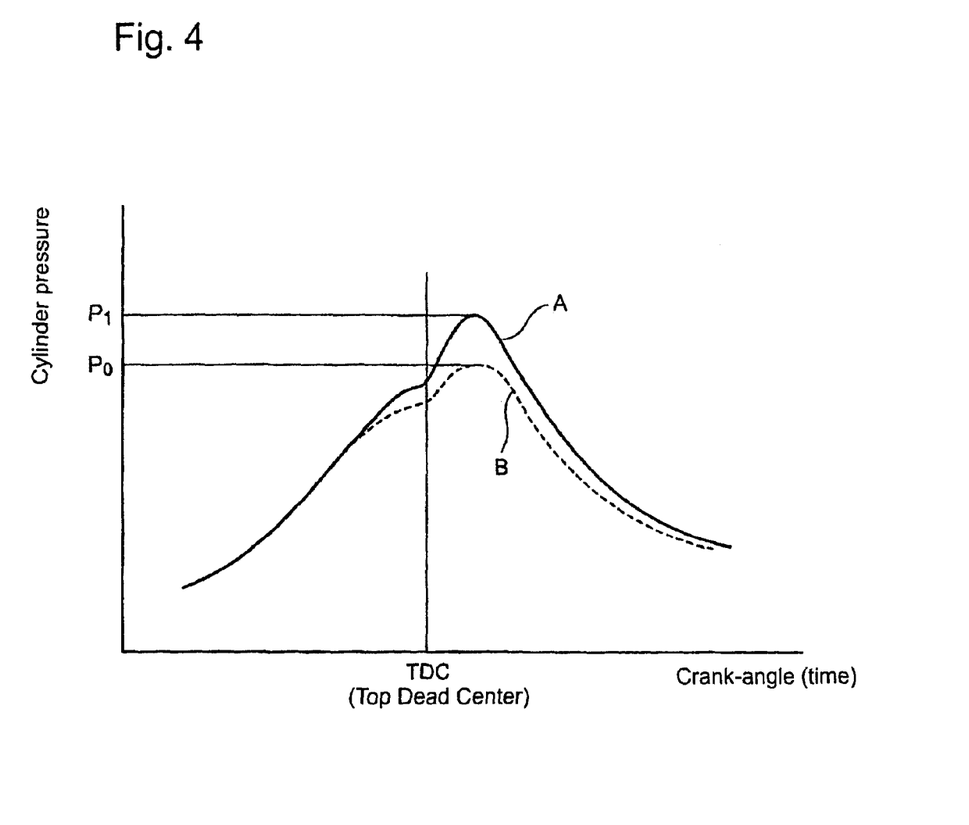
FIG. 4 shows an example of a diagnostic result by means of a combustion diagnosis unit.

FIG. 2 shows an example of a flow-chart diagram as to a starting method of a gas engine with a micro-pilot ignition system, according to an embodiment of the present invention; and FIGS. 3-1 and 3-2 show a starting action allocation table (i.e., a starting skip-firing allocation table) as to each cylinder of the gas engine with a micro-pilot ignition system:

FIG. 4 shows an example of a diagnostic result by means of a combustion diagnosis unit (i.e., cylinder pressure distributions along elapsed time).

As a first step (Step 1) in FIG. 2, a start order is transmitted to the engine; then, the engine is started with a ½ skip-firing intermittent operation (Step 2). As already mentioned, in FIG. 3-1, during the ½ skip-firing intermittent operation, each cylinder alternates a cycle with firing and a cycle without firing; that is, each cylinder repeats a cycle with combustion and a cycle without combustion alternately; namely, in a main combustion chamber (i.e., in each cylinder), a cycle with a combustion process and a cycle without a combustion process occur in turn.

Further, in the case of a ⅕ skip-firing intermittent operation, each cylinder repeats every five cycles with a non-firing cycle and four consecutive firing cycles as shown in the table of FIG. 3-2; namely, in the main combustion chamber, a cycle without a combustion process and four consecutive cycles with a combustion process are repeated in a cluster.

Secondly, the speed of the engine is increased (Step 6) to a 90% speed (90% N), that is, a prescribed percentage of a rated speed N, while the ½ skip-firing intermittent operation is performed (Step 2).

In starting the engine, when the engine speed reaches the mentioned 90% N, the opening-closing control unit 2 detects or judges whether or not the cylinder pressure distribution datum (along elapsed time) as to each cylinder of the engine 100 agrees with a prescribed distribution, based on the engine speeds retrieved from the engine detecting unit 4 and the datum accumulated, from the cylinder pressure sensor 5, by the combustion diagnosis unit 3 (Step 11).

In other words, the opening-closing control unit 2 as to the gas valve 1 estimates an engine (cylinder) combustion state as to each cylinder, based on a cylinder pressure distribution along elapsed time as analyzed by the combustion diagnosis unit 3 that continually retrieves cylinder pressure signals detected by a cylinder pressure sensor 5 fitted to each cylinder of the engine 100. In summation, with reference to FIG. 4, it is estimated that the combustion in a cylinder is abnormal if the cylinder pressure distribution as depicted by curve B is below a regular pressure distribution as depicted by curve A in the same figure; whereby, the maximum pressure of the curve B is $P_0$ that is lower than that of the maximum pressure of the regular pressure distribution curve A, namely $P_1$.

In the case when the opening-closing control unit 2 estimates that the cylinder pressure distribution analyzed by the combustion diagnosis unit 3 is normal, namely when the estimated distribution is the regular curve of the type A with a maximum pressure $P_1$ in FIG. 4, then the skip-firing mode is shifted into, for example, the ⅕ skip-firing intermittent operation (Step 12); thereby, the before-mentioned valve-opening-ratio is changed to a cluster of a non-firing and four consecutive firings.

Further, with reference to FIG. 4, in the case when the cylinder pressure distribution as depicted with a curve B with a maximum pressure $P_0$ is below a regular pressure distribution as depicted by curve A, the opening-closing control unit 2 estimates that the combustion has a weak part therein, and the skip-firing mode is kept, for example, at the ½ skip-firing intermittent operation so as to achieve stabilized operation (Step 13); hereby, the skip-firing mode causes a relatively strong fuel-gas pressure pulsation in the mentioned fuel-gas pipe 109 before the gas valve 1, the pulsation bringing relatively large fuel-gas supply while the valve is being opened; as a result, the air fuel-gas ratio is enhanced so that the normal cylinder pressure distribution is detected in the combustion diagnosis unit 3.

In a skip-firing mode, for example, in the ½ skip-firing intermittent operation, the number m corresponding to the number of the cluster of consecutive cycles is 2; whereby, a gas-valve opening and a gas-valve closing are repeated on a one-by-one basis, in turn. Where the mentioned 1/m skip-firing mode is concerned, the less the number m is the stronger the fuel-gas supply pressure pulsation is. On the basis of this principle, a skip-firing mode, namely, a skip-firing intermittent operation can be selected. After the detected cylinder pressure distribution conforms with the prescribed distribution, the engine is operated according to the selected skip-firing intermittent operation; then, the engine speed increased (Step 8) to the rated speed 100% N.

Of course, the fuel-oil injector 13 for ignition is not operated at the time of non-firing cycles.

Following the above, when the rated engine speed 100% N is detected and 10% load of the rated engine-load is reached at the same time (Step 9), then, the engine is put under normal speed operation (Step 10).

The skip-firing intermittent operation is performed, cylinder by cylinder, so that a uniform air fuel-gas ratio is secured over all the cylinders; therefore, the idling states (i.e., pressure distribution patterns) throughout the cylinders can be uniform and the deviations as to combustion patterns among all the cylinders can be minimized.

According to the embodiment described above, in starting the engine, each cylinder performs and repeats engine cycles (a cluster of cycles) of a skip-firing mode by means of a corresponding skip-firing intermittent operation of the gas valve 1; hence, a relatively strong fuel-gas pressure pulsation is caused in the mentioned fuel-gas pipe, the pulsation bringing relatively large fuel-gas supply while the valve is being opened in comparison with usual cycle repetition without skipping; thus, the air fuel-gas ratio is enhanced in firing engine-cycles as mentioned already. Thus, a cluster of intermittent combustion cycles is repeated in each main combustion chamber 101; yet, the combustion during a firing cycle in each main chamber 101 becomes stable and regular.

Secondly, the opening-closing control unit 2 as to the gas valve 1 estimates an engine (cylinder) combustion state as to each cylinder, based on a cylinder pressure distribution along elapsed time as analyzed by the combustion diagnosis unit 3 that continually retrieves cylinder pressure signals detected by the cylinder pressure sensor 5 fitted to each cylinder.

Thirdly, in a skip-firing mode, for example, in the ½ skip-firing intermittent operation, the number m corresponding to the number of the cluster of consecutive cycles is 2; whereby, a gas-valve opening and a gas-valve closing are repeated on a one-by-one basis, in turn. Where the mentioned 1/m skip-firing mode is concerned, the less the number m is the stronger the fuel-gas supply pressure pulsation is. On the basis of this principle, a skip-firing mode, namely, a skip-firing intermittent operation can be selected in consideration of the parameter m.

Thus, the cylinder pressure sensor 5 fitted to each cylinder continuously measures the pressure in each cylinder; the combustion diagnosis unit 3 continually retrieves the cylinder pressure signals from the sensor 5, analyzes the cylinder pressure signals, and forms a pressure distribution along elapsed time; further, the opening-closing control unit 2 as to the gas valve 1 estimates to what degree the formed pressure distribution along elapsed time agrees with a prescribed distribution, and selects a skip-firing mode with which the gas valve 1 is operated so as to achieve the air fuel-gas ratio for smooth and stable engine-starting. In this way, with the selected skip-firing intermittent operation, the air fuel-gas ratio in starting the engine is controlled with enhanced precision Further, the conventional idling time can be dispensed with; as a result, the starting time span of the engine 100 can be reduced.

INDUSTRIAL APPLICABILITY

The present invention provides a micro-pilot injection ignition type gas engine, whereby an air fuel ratio control in starting the engine is executed with enhanced precision, by means of introducing skip-firing intermittent operations which reflect the engine operation conditions, while an idling time span in the starting steps can be shortened or omitted. Thus, the disclosure of this specification is useful for industrial application.

What is claimed is:

1. A micro-pilot injection ignition type gas engine that ignites and burns premixed air fuel-gas mixture inducted into each main combustion chamber,
   by means of at least one pilot flame that jets out from a pre-chamber to the main chamber through at least one pre-chamber nozzle hole communicating the main chamber to the pre-chamber in which a fuel-oil injector injects micro-pilot fuel oil to produce a pre-chamber combustion gas as a source of the flame jet,
   the gas engine comprising:
   a gas valve that delivers and cuts a fuel-gas at a position in front of each cylinder, so as to arbitrarily control the throat area as well as an opening-or-closing time span of the gas valve;
   an engine speed detecting unit to detect the engine speed;
   a cylinder pressure sensor provided at each cylinder so as to continually measure pressure levels as to each cylinder;
   a combustion diagnosis unit to monitor the pressure levels so that the diagnosis unit analyzes an engine combustion state through a cylinder pressure distribution along elapsed time, the distribution as to each cylinder being formed in the diagnosis unit;

an opening-closing control unit as to the gas valve, so as to control an intermittent opening-or-closing of the gas valve in response to the engine speed and the pressure distribution;

whereby, in starting the engine, the intermittent opening-or-closing of the gas-valve enables at least one skip-firing mode that brings an enhanced fuel-supply pressure-pulsation with which an increased amount of fuel-gas is supplied per one engine-cycle with firing so that the air fuel-gas ratio of each cylinder reaches a prescribed target value.

2. The micro-pilot injection ignition type gas engine according to the claim 1, whereby the opening-closing control unit as to the gas valve makes the gas valve for each cylinder open and close, intermittently per each cylinder in turn according to a firing sequence of the engine, so that the air fuel-gas ratio reaches the prescribed target value, with the at-least-one skip-firing mode, and with a series of time spans as to the variable valve-opening-time span of the gas valve, the time spans being changed step by step.

3. The micro-pilot injection ignition type gas engine according to the claim 1, whereby the opening-closing control unit makes the gas valve for each cylinder open and close with a first skip-firing mode of a lower valve-opening-ratio in the case when the cylinder pressure distribution along elapsed time the distribution which is analyzed by the combustion diagnosis unit corresponds to a prescribed target distribution, whereas the opening-closing control unit makes the gas valve open and close with a second skip-firing mode of a higher valve-opening-ratio in the case when the cylinder pressure distribution along elapsed time does not reach the prescribed target distribution.

* * * * *